United States Patent [19]

Neusy

[11] Patent Number: 4,487,620
[45] Date of Patent: Dec. 11, 1984

[54] METHOD AND APPARATUS FOR MANUFACTURING ROUNDED VITREOUS BEADS

[75] Inventor: Hubert Neusy, Montignies-sur-Sambre, Belgium

[73] Assignee: Glaverbel, Brussels, Belgium

[21] Appl. No.: 501,907

[22] Filed: Jun. 8, 1983

[30] Foreign Application Priority Data

Jun. 8, 1982 [GB] United Kingdom ............... 8216648

[51] Int. Cl.³ .............................................. C03B 19/10
[52] U.S. Cl. ...................................... 65/21.3; 65/21.4; 65/22; 65/142
[58] Field of Search ............... 65/21.3, 21.4, 22, 142

[56] References Cited

U.S. PATENT DOCUMENTS 2,978,339  4/1961  Veatch et al. .................. 65/21.4
4,385,917  5/1983  Aston et al. .................... 65/21.3

FOREIGN PATENT DOCUMENTS 1161396  8/1958  France .
47-20208  9/1972  Japan ............................. 65/21.4

*Primary Examiner*—Robert Lindsay
*Attorney, Agent, or Firm*—Spencer & Frank

[57] ABSTRACT

A method of forming rounded vitreous beads in which particles of bead forming material entrained in a gas stream having comburent and combustible components are projected from a burner head and the gas is burnt. A first component of the combustible gas mixture with entrained particles is propelled along a passageway leading to the burner head, a second gas component is forced transversely into that passageway through at least one orifice in its peripheral wall and the mixed gases in which the particles are entrained are subjected to forces further promoting intimate mixture thereof before reaching the burner head. Apparatus for performing the method includes a burner head and conduit means for supplying the burner head which includes a first passageway for feeding a first component of a combustible gas mixture with entrained bead forming particles to the burner head, and a second passageway for force-feeding a second gas component transversely into such first passageway through one or more orifices in its wall to form a combustible admixture with said first gas component and the entrained particles. The burner tube is provided with an aperture for admitting the gas mixture to the burner tube transversely to the longitudinal axis of the burner tube.

29 Claims, 3 Drawing Figures

METHOD AND APPARATUS FOR MANUFACTURING ROUNDED VITREOUS BEADS

BACKGROUND OF THE INVENTION

This invention relates to a process of forming rounded vitreous beads in which particles of bead-forming material entrained in a gas stream having comburent and combustible components, are projected from a burner head and the gas is burnt. The invention includes apparatus for use in performing such a process.

Various proposals have been made for the manufacture of vitreous beads, such as that set forth in French Patent specification No. 1,161,396 (Centre National de la Recherche Scientifique). As described in that specification, air in which bead forming particles are entrained is fed to a combustion chamber via a burner head along a conduit which is surrounded by two other concentric conduits each carrying a combustible gas/air mixture. In order to promote mixing of the particle entraining air stream and the gas/air streams, that conduit which immediately surrounds the inner one is so shaped as to cause the gas/air mixture flowing along it to swirl as it emerges at the burner head. It has been found however that the mixing in the combustion chamber is not efficient and that the bead forming particles still tend to be carried along in a central air stream which is surrounded by a combustible mixture with the result that when the gas is ignited, the outer particles tend to shield the inner particles from the heat produced and the yield of well formed beads is not as high as would be desired.

SUMMARY OF THE INVENTION

It is an object of the present invention to provide a more efficient process for the production of rounded vitreous beads.

According to the present invention, there is provided a process of forming rounded vitreous beads in which particles of bead-forming material entrained in a gas stream having comburent and combustible components are projected from a burner head and the gas is burnt, characterised in that a first component of the combustible gas mixture with entrained particles is propelled along a passageway leading to the burner head, a second gas component is forced transversely into that passageway through at least one orifice in its peripheral wall and the mixed gases in which the particles are entrained are subjected to forces further promoting intimate mixture thereof before reaching the burner head.

When operating in accordance with the invention each individual particle of the bead-forming material will be surrounded by flame so that none will be shielded by others and all the particles will accordingly be subjected to substantially the same heating schedule. Since the beads will all be treated similarly, uniformity of product quality will be improved. The beads will also be heated more rapidly. Rapid heating is obtained because the comburent and combustible gases are intimately mixed, and therefore the flame produced will be harder and hotter. Because of the harder and hotter flame and the resulting more rapid heating, it is possible to obtain beads of a good quality in a shorter time, that is, with a shorter flame. The residence time of the particles in the flame may be less than half a second, for example 0.1 to 0.2 second. The use of a shorter flame permits reduction of combustion chamber dimensions.

Also because the flame is harder and hotter, it is possible to reduce the specific quantity of combustible gas used for a given quantity of bead-forming material processed.

Air may be used as the comburent, and it will normally be used in greater volume than the combustible gas. It is accordingly preferred that said first component of the gas mixture which entrains the bead-forming particles should be constituted by air.

Preferably, the forces causing intimate mixture of the gas components are forces causing swirling of the gas mixture. This is a very simple way of achieving the turbulent flow necessary to effect intimate mixture of the gas components.

Advantageously, the first gas component is subjected to directional change at the zone where the second gas component is forced through said orifice(s). The gas mixture can thereby be caused to swirl by the geometry of the apparatus used.

In the most preferred embodiments of the invention, the directional change is imposed by a volute via which the first gas component flows into a butner tube leading to the burner head. This is found to be highly beneficial for promoting intimate mixture of the gas components. For similar reasons, it is preferable for the second gas component to be forced into such first volute via an embracing second volute. It is preferred for the two volutes to be oppositely directed.

In some preferred embodiments of the invention, there is added to at least one of the components of the combustible gas mixture a gaseous material which, on burning of the mixture promotes thermal transfer from the resulting flame to the bead forming particles. Water vapour and carbon dioxide are especially preferred examples of such a gaseous material. The use of such a gaseous material promotes efficient formation of rounded vitreous beads. Such gaseous material may for example constitute up to 20% of the particle-entraining gas component.

When operating in accordance with the present invention, there is a risk that a small proportion of the particles of bead-forming material may escape from the hard flame produced before they have been satisfactorily heated. In order to reduce or eliminate this risk and thus further to increase the yield, and to promote the production of good quality beads it is preferred that the combustible gas mixture with entrained particles be projected from the burner head while surrounded by an enveloping stream comprising a second combustible gas mixture. Because of the presence of bead-forming particles in the first combustible gas mixture, the flame due to that mixture is attenuated. The use of a second, surrounding combustible gas mixture has the further advantage of maintaining good flame propagation.

In order that this second gas mixture should also give rise to a hot, hard flame, it is preferred that the second gas mixture be fed to an auxiliary burner head which surrounds the first burner head in first and second components in a manner as defined above in respect to the particle-entraining gas mixture.

After the mixed gases in which the particles have been entrained have been subjected to the forces further promoting intimate mixture, it is preferred that the gas stream is caused to pass through a constriction on its way to the burner head. This has been found to improve the distribution of bead-forming particles in the entraining gas stream and also to reduce the risk that any particles of bead-forming material may escape from the flame before they have been satisfactorily heated.

The invention includes apparatus for forming rounded vitreous beads by a process as herein defined, which apparatus comprises a burner head, and conduit means for supplying the burner which includes a first passageway for feeding a first component of a combustible gas mixture with entrained bead-forming particles to the burner head, and a second passageway for force feeding a second gas component transversely into such first passageway through one or more orifices in its wall and thence transversely into a burner tube leading to the burner head in combustible admixture with the first gas component and the entrained particles.

Apparatus according to the invention preferably includes one or more of the following optional features:
(a) the first passageway terminates in a volute embracing the burner tube and the orifice(s) is or are formed in a wall of the volute;
(b) said orifice(s) is or are arranged along the outside peripheral wall of the volute;
(c) the second passageway terminates in a second volute embracing such first volute;
(d) the first and second volutes are oppositely directed;
(e) second conduit means is provided for supplying the burner head with a second combustible gas mixture which envelopes the particle entraining gas mixture;
(f) the second conduit means for supplying the second combustible gas mixture to the burner head has one or more to the features defined above in respect of the conduit means for supplying the particle entraining gas mixture;
(g) between the transverse entrance to the burner tube for the particle-entraining gas mixture and the burner head there is provided a constricted burner tube section.

The present invention is useful in the manufacture of solid and of cellulated beads.

BRIEF DESCRIPTION OF THE DRAWING

The invention will now be further described by way of example and with reference to the accompanying diagrammatic drawings, in which.

DESCRIPTION OF THE PREFERRED EMBODIMENTS

Figure 1:
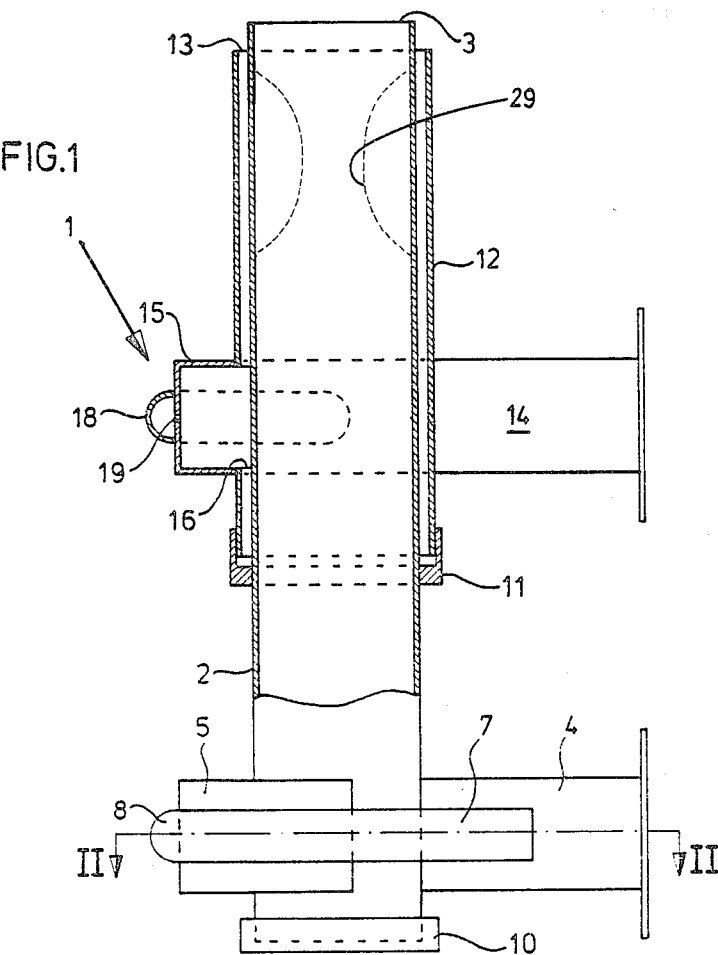
FIG. 1 is an elevational view in partial section of a burner assembly according to the invention.
Figure 2:
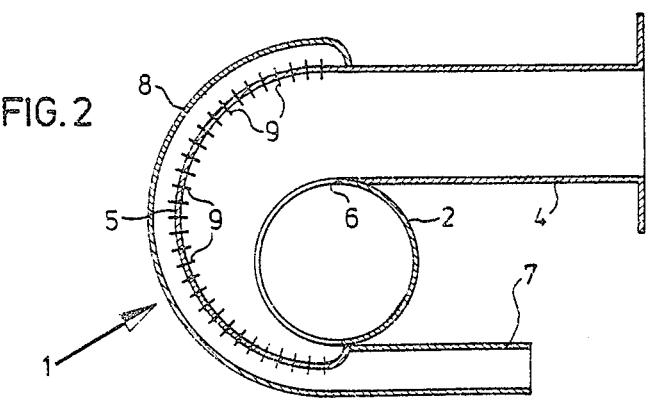
FIG. 2 is a sectional view along line II—II of FIG. 1.

In FIGS. 1 and 2, the burner assembly generally indicated at 1 comprises a burner tube 2 terminating in a burner head 3. Conduit means supplying the burner head 3 includes a first passageway 4 terminating in a volute 5 embracing the burner tube 2 and communicating with its interior via an aperture 6 (FIG. 2) which is large enough so as not to impede the passage of any bead-forming particles entrained in a gas stream passing along the first passageway 4 and into the burner tube 2.

A second passageway 7 for supplying a second gas component terminates in a second volute 8 which embraces the first and is in communication therewith via a plurality of holes whose positions in the outside peripheral wall of the first volute 5 are indicated at 9. It will be noted that the volutes 5, 8 are oppositely directed.

The base of the burner tube 2 is closed by a cap 10.

A collar 11 is fixed to the burner tube 2 above the level of the two volutes 5, 8 for securing an outer auxiliary burner tube 12 terminating in an auxiliary burner head 13 provided with auxiliary gas supply means which are, in this embodiment, identical with those described above save insofar as the size of the volutes is altered to accommodate the greater diameter of the outer burner tube 12. The parts of the auxiliary gas supply means are indicated by reference numerals ten higher than those of the above described main supply.

Because of the transverse injection of the second gas component into the first through the holes 9, 19 the gases are already well mixed when they enter the burner tubes 2, 12 and because of the geometry of the gas supply systems swirling motion is imparted to those mixtures as they flow along the burner tubes 2, 12 to the burner heads 3, 13 so that each is intimately mixed prior to ignition.

Because the holes 9 are in the outside peripheral wall of the first main volute 5, the injection of the second gas component also tends to act on the particles of bead-forming material entrained in the first gas component so as to at least partially compensate for centrifugal forces acting on them as they pass through the volute.

Figure 3:
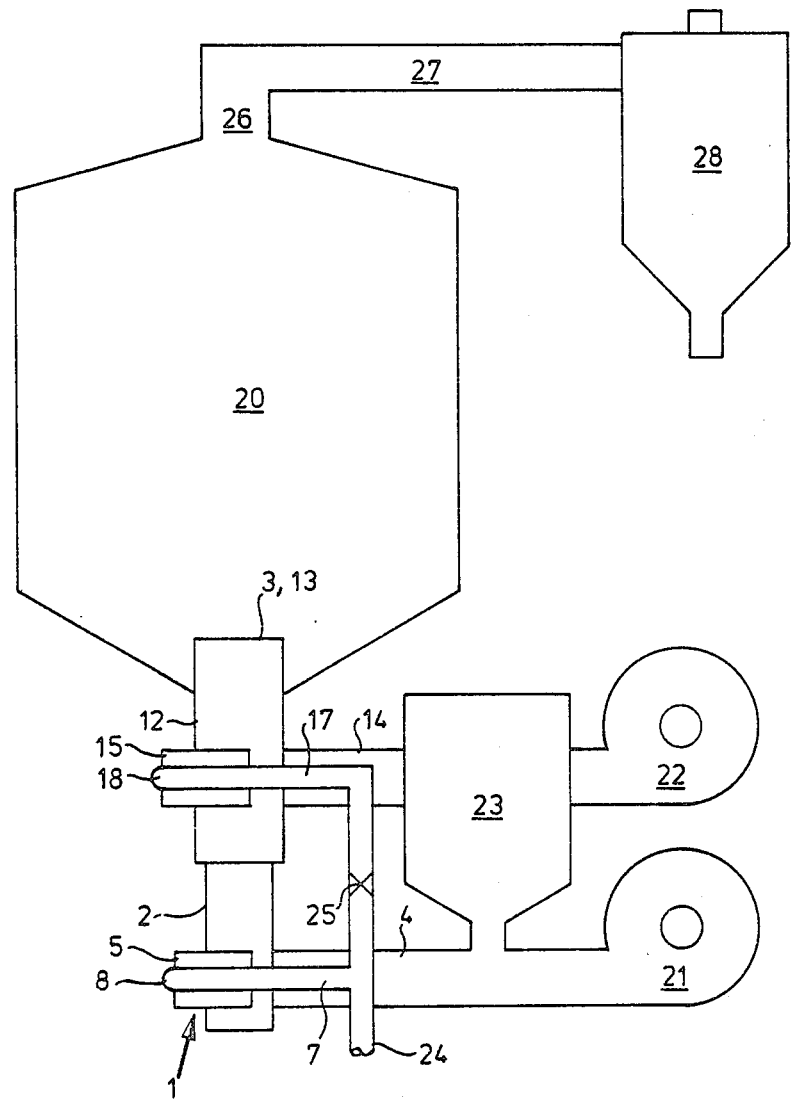
FIG. 3 is a schematic view of a plant for producing rounded vitreous beads in accordance with the invention.

FIG. 3 illustrates a plant for the production of rounded vitreous beads incorporating a burner assembly 1 as described with reference to FIGS. 1 and 2 located at the base of a combustion chamber 20. Air is supplied as a first gas component to main and auxiliary first passageways 4, 14 by blowers 21, 22 and feed means including a hopper 23 is provided for injecting particles of bead-forming material into the air stream flowing along the main first passageway 4. Combustible gas is supplied to main and auxiliary second passageways 7, 17 by a common feed line 24 incorporating a constrictor valve 25 so that different quantities of gas can be supplied. Alternatively separate supplies may be used. In the Examples that follow, this combustible gas was natural gas, but town gas or other combustible gas may be used depending on convenience and availability.

The gas mixtures are ignited at the burner heads 3, 13, where the auxiliary burner tube 12 provides a flame curtain surrounding the main flame emanating from the main burner tube 2 to prevent entrained particles of bead-forming material from escaping sideways without being heated and to stabilise the main flame.

The hot exhaust gases and the entrained beads which have now been rounded by the action of the flame are carried up to a chimney 26 in the roof of the combustion chamber 20 and thence along pipe 27 to a separator 28 from whose base the finished beads may be collected.

In an optional modification of the burner assembly described above the main burner tube 2 includes a constricted portion 29, indicated in dotted lines in FIG. 1, which is located downstream of the entry to that burner tube and preferably close to the burner head 3. This of course entails a speeding up of the gas stream at that constricted zone and a slowing down and reduction in pressure beyond that zone, and this has been found to have a beneficial effect on the distribution of entrained bead-forming particles in the gas-stream under some circumstances. In particular, it reduces any tendency those particles may have to fly out of the flame beyond the burner head due to centrifugal forces arising from the swirling forces imparted to the gas stream as it enters the burner tube 2 at the aperture 6. A further advantage of having such a constriction in the burner tube is that it reduces the risk of flash-back.

EXAMPLE 1

Solid glass beads have been produced in a plant as described with reference to FIG. 3 using the burner assembly described above.

In fact solid microbeads having an average diameter below 100 μm were produced at a rate between 100 and 120 kg/hour having a bulk density of 1 to 1.1 kg/L.

Suitably crushed glass cullet was introduced into a main airstream supplied at 210 m³(N) per hour. The main natural gas feed was 35 m³(N) per hour. The auxiliary burner was fed with 90 m³(N) air and 15 m³(N) natural gas per hour.

A very high yield of excellent quality microbeads was produced.

EXAMPLE 2

Cellular glass beads have been produced in a plant as described with reference to FIG. 3 using the burner assembly described above.

In order to produce cellular beads at a rate of 100 to 120 kg/hour, particles of bead-forming material were introduced into a main airstream supplied at a rate of 240 m³(N) per hour which was then mixed with a main natural gas stream flowing at 43 m³(N) per hour. The auxiliary burner was fed with 120 m³(N) air and 23 m³(N) natural gas per hour. The gas streams were ignited at the burner heads to fire the beads. The bead-forming material used was produced as follows.

An aqueous solution of sodium silicate (38° Baume) was fed into a mixing vessel with glass grains (size range 20-100 microns) mixed with powdered urea as cellulating agent. The glass has the following composition in percentages by weight: 70.4 $SiO_2$, 12.78 $Na_2O$, 12.14 CaO, 1.77 MgO, 1.92 $Al_2O_3$, the remainder being impurities. The sodium silicate solution was introduced in an amount of 10.5 liters per 20 kg of the glass. The urea was introduced in an amount equal to 2% by weight based on the weight of the glass. The slip was discharged into a further vessel fitted with a stirrer. The viscosity of the slip in the further vessel was measured by a viscosameter and in dependence on the viscosity measurement, water was introduced so that the viscosity of the slip was maintained at substantially 3000 cP. The slip was pumped out via a filter to one or more spray heads in a drying tower at the rate of 15 to 20 liters per minute. Air under pressure was fed as required to the spray heads. The drops of the slip discharged from the spray heads were of various sizes in the range 100-1000 microns.

Hot gases discharging from the combustion chamber 20 were fed into the base of the drying tower. The gases on entry into the drying tower had a temperature in the range 200° to 400° C. The drops discharging from the spray heads while being rapidly heated in such tower, were entrained upwards by the ascending hot gas streams. In the drying tower water evaporated from the ascending drops so that they became converted into self-sustaining particles containing the glass grains held together by sodium silicate as binder. At the same time some decomposition of the urea took place with the evolution of gases causing some expansion of the embryonic particles. The formed particles discharged continuously from the top of the drying tower into a gas separator in which the particles gravitated preparatory to being fed into the combustion chamber 20 via the burner assembly 1. On leaving the top of the drying tower the particles had solidified and dried sufficiently for them to be able to be collected in bulk without mutual adhesion. Examination of samples of particles taken from the separator showed that each of a predominant number of them comprised a group of glass grains held together by a sodium silicate skin which extended around each of the glass grains and around the whole group as an enveloping surface layer. Within the body, between the coated glass grains, there were small cells filled with gases resulting in part from the partial decomposition of the urea. The bulk density of the particles was about 0.4 to 0.6 kg/L The particles were fed to the combustion chamber 20 as described above to give a very high yield of rounded vitreous beads in the size range 0.15 to 2.5 mm with a bulk density of about 0.25 kg/L.

EXAMPLE 3

Expansible particles of bead-forming material were formed as in Example 2 but with the modification that instead of the urea, calcium carbonate powder (average grain size 0.08 micron) was employed as cellulating agent in an amount of 3% by weight based on the weight of the glass. The prepared slip thus contained substantially the same proportion of water, namely 35% by weight, as the slip used in Example 2. The temperature in the drying tower was 500° to 600° C., which was sufficient to cause partial decomposition of the calcium carbonate during the residence of the drops of the slip in the drying tower.

The expansible particles, which were collected from the gas separator, had a bulk density of about 0.8 to 1.0 kg/L. These particles were then converted into cellular glass beads in the same way as the particles in Example 2.

EXAMPLE 4

Expansible bead-forming particles were formed from glass grains in the size range 60 to 150 microns, urea, and sodium silicate solution (38° Baume). The glass had the same composition as that used in Example 2. The urea was used in a proportion of 2% by weight based on the weight of the glass. The sodium silicate solution was used in an amount of 10.5 liters per 20 Kg of glass. Water was added to bring the viscosity of the slip to approximately 5000 cP, corresponding with approximately 35% by weight of water.

The sodium silicate solution on the one hand and the glass grains mixed with the powdered urea on the other hand were fed from respective containers into the mixing vessel of the apparatus as used in Example 2 and water was added in dependence on the viscosity measured in the further vessel.

The slip was sprayed into the drying tower in the form of drops in the size range 150 microns to 1.5 mm. The drying tower temperature was 300° C. In the drying tower water evaporated. Each of the particles collected from the drying tower comprised glass grains held together by sodium silicate. The particles contained cells due to evolution of gas consequent upon the partial decomposition of the urea, and to some extent also to evaporation of water from the drops during heating in the drying tower. The particles were in the size range 200 microns to 2 mm and had a bulk density of 0.4 kg/L.

In a subsequent processing stage the bead-forming particles were projected and fired as described in Example 2. In this firing treatment, further decomposition of urea occurred with evolution of further gas. The glass melted and the quantities of molten glass merged to form a unitary mass. Outward displacement of molten glass occurred under the internal pressure created by the gas. The sodium silicate became chemically integrated with the glass. Examination of the resulting vitreous beads after cooling thereof showed that they were composed of a unitary mass of glass and had a cellular structure. The glass beads had a bulk density of 0.2 kg/L.

The same example was repeated but with the modification that the slip from which the expansible particles were formed included saw-dust. In the processing, the saw-dust in the individual particles burned. Vitreous cellular beads were again obtained.

EXAMPLE 5

Hollow beads of soda-lime glass were manufactured from bead-forming material produced as follows.

The plant used comprised four vessels for holding quantities of starting materials. The vessels had stirrers driven by motors. The first vessel contained an aqueous solution of commercial sodium silicate (38° Baume). The second vessel contained an aqueous solution of calcium hydroxide at 80° C. The third vessel contained an aqueous solution of sodium carbonate at 80° C. The fourth vessel contained an aqueous solution of urea at 60° C.

Calcium hydroxide solution and sodium carbonate solutions from the second and third vessels were fed into a mixing tank in a ratio corresponding with 2.64 parts by weight of calcium hydroxide per 3.41 parts by weight of sodium carbonate. The solutions were intimately mixed in the tank by means of its stirrer and a reaction occurred between the calcium hydroxide and sodium carbonate, resulting in the formation of a solution containing sodium hydroxide, calcium carbonate and a small residual amount of dissolved sodium carbonate.

The solution formed in the mixing tank and sodium silicate solution from the first vessel were fed into a principal mixer, likewise fitted with a stirring device, in proportions corresponding with 100 parts by weight of sodium silicate per 2.64 parts by weight of calcium hydroxide and per 3.41 parts by weight of sodium carbonate. At the same time water was fed into the mixer to bring the viscosity of the fluid medium in the mixer to 2,300 centipoises.

On a first run, a valve between the fourth vessel and the principal mixer was closed so that urea was not used in the process.

The fluid medium formed in the principal mixer contained dissolved sodium silicate and sodium hydroxide, and calcium carbonate in suspension. In the formation of glass beads from this fluid medium as will now be described, those three constituents together served as glass-forming material and the calcium carbonate additionally served as a cellulating agent.

The fluid medium was fed from the principal mixer into a container fitted with a stirrer, in which container the viscosity of the medium was measured. Depending on this measurement the flow of water into the principal mixer was regulated so as to keep the viscosity of the fluid medium at about 2,300 cP. After passing through a filter, the fluid medium was delivered by a pump to spray heads in which the fluid medium was atomised by means of compressed air delivered from a compressor. The spray heads discharged the fluid medium as drops smaller than 500 microns in size. The drops were discharged directly into the main first passageway 4 and thence upwardly into the combustion chamber 20.

On contact with the ascending currents of hot gas in the combustion chamber many of the drops of fluid medium became disrupted by internal pressures generated by evaporation of water and decomposition of calcium carbonate and formed drops of still smaller sizes. All of the drops were carried upwardly within the chamber by the hot gas streams. During their ascent, and as the temperature of the drops increased towards 750° C., solid material in the individual drops became converted to a vitreous skin or envelope. At the same time expansion of gas entrapped in the drops increased their volumes.

The drops, in the form of hollow glass beads, were discharged from the top of the combustion chamber 20 into the pipe 27 leading tangentially into a cyclone separator 28 having a central top opening for the discharge of gases and a bottom apex aperture for the discharge of the beads. During their movement along pipe 27 and within the cyclone separator, the beads became cooled sufficiently for them to be collectable in bulk without mutual adherence of the beads. The beads were discharged from the cyclone separator into a hopper and from there onto a conveyor for transportation to a delivery point where they could be stored or packaged or put directly to industrial use.

The hollow glass beads were composed of glass of the following approximate composition by weight:
$SiO_2$: 70%
$Na_2O$: 25%
$CaO$: 5%

The hollow beads were mostly in the size range between 10 and 250 microns and they had a bulk density of 0.1 to 0.3 kg/L. The majority of the beads were formed by microcellular shells.

In a second run, the same processing conditions were observed but the valve was opened to cause urea to be introduced into the composition of the fluid medium formed in the principal mixer in a proportion of approximately 3% by weight based on the weight of the sodium silicate. Hollow glass beads were formed as in the first run but they had a slightly lower bulk density.

EXAMPLE 6

Sodium borosilicate glass beads were formed in the following manner. The plant used comprised four vessels for holding quantities of starting materials.

The first vessel contained an aqueous solution of commercial sodium silicate (38° Baume).

The second vessel contained an aqueous solution of boric acid at 80° C. The third vessel contained an aqueous solution of sodium hydroxide of 50% concentration at 80° C.

Boric acid solution and sodium hydroxide solution from the second and third vessels were fed into a mixing tank in order to form in this tank a neutral solution. This neutral solution was supplied to a principal mixer together with sodium silicate solution from the first vessel an aqueous solution of urea from the fourth vessel and water. The urea solution contained 200 g of urea per 10 liters of water and was at a temperature of 60° C. The mixing ratio in the principal mixer corresponded with 10 kg of sodium silicate per 1.1 kg of boric acid per 200 g of urea and the addition of water was regulated to give the fluid medium in the principal mixer a viscosity of 500 cP.

Due to the neutralisation of the acid by the sodium hydroxide the fluid medium in the principal mixer showed no tendency to gel formation.

The fluid medium was sprayed into a drying tower as described in Example 2 to form solid particles of bead-forming material which were then further processed again as described in Example 2.

Hollow glass beads comprising microcellular shells were collected from the cyclone separator. The beads were below 250 microns in size and had a bulk density from 0.1 to 0.2 kg/L. The approximate composition by weight of the borosilicate glass forming the beads was:

$SiO_2$: 65.5%
$Na_2O$: 19.5%
$B_2O_3$: 15%

Hollow beads of a range of different borosilicate glasses can be formed by increasing or decreasing the proportion of boric acid used in the composition of the fluid medium in the foregoing example and provided the proportion of sodium hydroxide used is correspondingly varied to ensure neutralisation of the medium, gel formation will be avoided. By way of example the boron oxide content of the formed glass could be increased to above 50% by increasing the proportion of boric acid in the fluid medium and in that case the glass has a lower softening temperature so that lower chamber temperatures could be used.

A further possible modification of the foregoing example resides in the use of calcium hydroxide as base instead of sodium hydroxide. Another possible modification involves the addition of sodium aluminate, e.g. in a proportion of 100 g per 10 kg of sodium silicate, so as to improve the chemical resistance of the hollow glass beads produced in the process.

In a variant of any of the foregoing Examples, water vapour and/or carbon dioxide in small amounts, for example up to 20% by volume is introduced into the particle entraining air-stream fed to the burner head so as to promote heat transfer to the particles while they dwell in the flame produced.

I claim:

1. A method of forming rounded vitreous beads in which particles of bead forming material entrained in a combustible gas mixture having comburent and combustible components are projected from a burner head as the gas is burned, comprising the steps of:
   entraining the particles in a first component of the combustible gas mixture;
   propelling the first component with entrained particles along a passageway leading to the burner head;
   forcing a second gas component of the combustible gas mixture transversely into the passageway through at least one orifice in a peripheral wall of the passageway to form the combustible gas mixture; and
   subjecting the combustible gas mixture in which the particles are entrained to forces further promoting intimate mixing thereof before reaching the burner head.

2. A method according to claim 1, wherein said subjecting step includes causing a swirling of the combustible gas mixture.

3. A method according to claim 1, wherein said subjecting step includes subjecting the first gas component to directional change at the location where the second gas component is forced through the at least one orifice.

4. A method according to claim 3, wherein said subjecting step includes providing a volute in the passageway for imposing the directional change and via which the first gas component flows into a burner tube leading to the burner head.

5. A method according to claim 4, wherein the volute constitutes a first volute and said subjecting step includes providing a second volute embracing the first volute and forcing the second gas component into the first volute via the second volute.

6. A method according to claim 5, wherein said subjecting step includes arranging the two volutes to be oppositely directed.

7. A method according to claim 1, including adding to at least one of the components of the combustible gas mixture a gaseous material which on burning of the mixture promotes thermal transfer from the resulting flame to the bead-forming particles.

8. A method according to claim 7, wherein the gaseous material is water vapor.

9. A method according to claim 7, wherein the gaseous material is carbon dioxide.

10. A method according to claim 1, wherein the combustible gas mixture constitutes a first combustible gas mixture and including the additional step of projecting the first combustible gas mixture with entrained particles from the burner head while surrounding the projected first combustible gas mixture with an enveloping stream comprising a second combustible gas mixture.

11. A method according to claim 10, wherein the burner head constitutes a first burner head and the passageway constitutes a first passageway, and including providing a second burner head surrounding the first burner head and feeding the second combustible gas mixture to the second burner head, the second gas mixture having first and second components, and wherein said feeding step includes: propelling the first component of the second combustible gas mixture along a second passageway leading to the second burner head; forcing the second component of the second combustible gas mixture transversely into the second passageway through at least one orifice in a peripheral wall of the second passageway; and subjecting the second combustible gas mixture to forces further promoting intimate mixing thereof before reaching the second burner head.

12. A method according to claim 11, wherein said subjecting step associated with the second combustible gas mixture includes causing a swirling of the second combustible gas mixture.

13. A method according to claim 11, wherein said subjecting step associated with the second combustible gas mixture includes subjecting the first gas component of the second combustible gas mixture to directional change at the location where the second gas component of the second combustible gas mixture is forced through the at least one orifice of the peripheral wall of the second passageway.

14. A method according to claim 13, including providing a volute for imposing directional change of the first gas component of the second combustible gas mixture and via which the first gas component of the second combustible gas mixture flows into a burner tube leading to the second burner head.

15. A method according to claim 14, wherein the volute constitutes a first volute and said subjecting step associated with the second combustible gas mixture includes providing a second volute embracing the first volute and forcing the second gas component of the second combustible gas mixture into the first volute via the second volute.

16. A method according to claim 15, wherein said subjecting step associated with the second combustible gas mixture includes arranging the volutes to be oppositely directed.

17. A method according to claim 1, including causing the first gas mixture to pass through a constriction on its way to the burner head after said subjecting step.

18. Apparatus for forming rounded vitreous beads, comprising:
   a burner head;
   a burner tube leading to said burner head and having an aperture for admitting gas transversely to the longitudinal axis of said burner tube;
   conduit means connected for supplying said burner head with a combustible gas mixture, said conduit means including a first passageway for feeding a component of the first combustible gas mixture with entrained bead-forming particles to said burner head via said burner tube, said first passageway having a wall with at least one orifice therein, said conduit means additionally including a second passageway in communication with the at least one orifice in said wall for force-feeding a second gas component transversely into said first passageway through the at least one orifice in said wall to form the combustible gas mixture with the first gas component and the entrained particles, and for then feeding the combustible mixture into said burner tube through said aperture of said burner tube.

19. Apparatus according to claim 18, wherein said passageway includes a first volute in which said first passageway terminates, said volute embracing said burner tube, with said at least one orifice being formed in a wall of said volute.

20. Apparatus according to claim 19, wherein said volute has an outside peripheral wall and the at least one orifice is arranged along said outside peripheral wall.

21. Apparatus according to claim 19, wherein said volute constitutes a first volute and said second passageway includes a second volute in which said second passageway terminates and said second volute is arranged to embrace said first volute.

22. Apparatus according to claim 21, wherein said first and second volutes are arranged to be oppositely directed.

23. Apparatus according to claim 18, wherein said burner head constitutes a first burner head and the combustible gas mixture constitutes a first combustible gas mixture and further including an auxiliary burner head surrounding said first burner head; and second conduit means connected for supplying said auxiliary burner head with a second combustible gas mixture which envelopes the first combustible gas mixture when the first combustible gas mixture exits said first burner head.

24. Apparatus according to claim 23, wherein said second conduit means includes: a third passageway for feeding a first component of the second combustible gas mixture to said auxiliary burner head, said third passageway having a wall with at least one orifice therein; and a fourth passageway in communication with the at least one orifice of said third passageway for force-feeding a second component of the second combustible gas mixture transversely into said third passageway through the at least one orifice in the wall of said third passageway in combustible admixture with the first gas component of the second combustible gas mixture.

25. Apparatus according to claim 24, and further including a second burner tube leading to said auxiliary burner head and wherein said third passageway includes a volute in which said third passageway terminates, said volute being arranged to embrace said second burner tube; and the at least one orifice of said third passageway being formed in a wall of said third volute.

26. Apparatus according to claim 25, wherein said volute has an outside peripheral wall and the at least one orifice is arranged along said outside peripheral wall.

27. Apparatus according to claim 25, wherein said volute constitutes a first volute and said fourth passageway includes a second volute in which said fourth passageway terminates and said second volute is arranged to embrace said first volute.

28. Apparatus according to claim 27, wherein said volutes are arranged to be oppositely directed.

29. Apparatus according to claim 18, wherein said burner tube includes a constricted section between the aperture and said burner head.

* * * * *